United States Patent
Liu

(10) Patent No.: US 10,246,598 B2
(45) Date of Patent: Apr. 2, 2019

(54) MANUFACTURE METHOD OF QUANTUM DOTS PRINTING INK AND QUANTUM DOTS PRINTING INK MANUFACTURED WITH THE MANUFACTURE METHOD

(71) Applicant: Shenzhen China Star Optoelectronics Technology Co., Ltd., Shenzhen (CN)

(72) Inventor: Yawei Liu, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 341 days.

(21) Appl. No.: 15/108,321

(22) PCT Filed: Apr. 26, 2016

(86) PCT No.: PCT/CN2016/080282
§ 371 (c)(1),
(2) Date: Jun. 27, 2016

(87) PCT Pub. No.: WO2017/161629
PCT Pub. Date: Sep. 28, 2017

(65) Prior Publication Data
US 2018/0100079 A1 Apr. 12, 2018

(30) Foreign Application Priority Data
Mar. 24, 2016 (CN) .......................... 2016 1 0176329

(51) Int. Cl.
*B82Y 20/00* (2011.01)
*B82Y 30/00* (2011.01)
(Continued)

(52) U.S. Cl.
CPC ............ *C09D 11/50* (2013.01); *C09D 11/033* (2013.01); *C09D 11/037* (2013.01); *C09D 11/322* (2013.01); *C09D 11/36* (2013.01); *C09D 11/38* (2013.01); *C09D 11/52* (2013.01); *C09K 11/025* (2013.01); *B82Y 20/00* (2013.01);
(Continued)

(58) Field of Classification Search
CPC ............ C09D 11/32; C09D 7/67; C09D 5/22
See application file for complete search history.

(56) References Cited

FOREIGN PATENT DOCUMENTS

CN 105062218 A 11/2015
CN 105131712 * 12/2015

* cited by examiner

*Primary Examiner* — C Melissa Koslow
(74) *Attorney, Agent, or Firm* — Leong C. Lei

(57) ABSTRACT

Disclosed are a manufacture method of quantum dots printing ink and manufactured quantum dots printing ink manufactured with the manufacture method. In the manufacture method, by mixing the first solvent and the second solvent, the viscosity of the quantum dots printing ink is adjusted to be in a predetermined range. Then, by mixing the third solvent with the first and second solvent, the surface tension thereof is adjusted to be in a predetermined range while maintaining the viscosity to be in the predetermined range. Furthermore, by adding the fourth solvent in the quantum dots printing ink, the vapor pressure is adjusted to be in a reasonable range. With mixture of kinds of solvents, the quantum dots printing ink of which the performance indicators, the viscosity, the surface tension, the dry condition are suitable for jet ink printing can be formulated to avoid adding the surfactant in the ink.

7 Claims, 1 Drawing Sheet

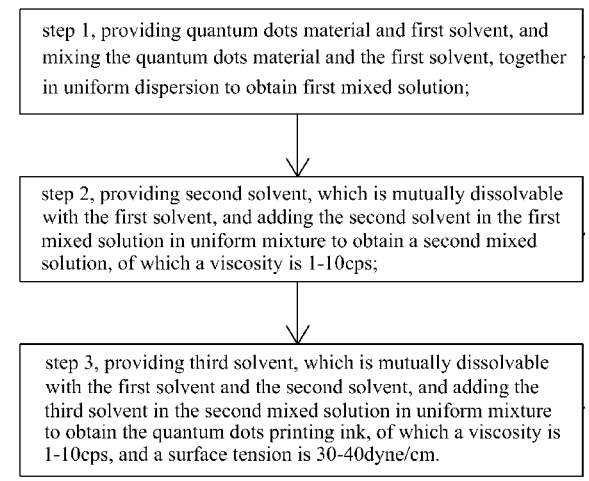

(51) Int. Cl.
*B82Y 40/00* (2011.01)
*C09D 11/36* (2014.01)
*C09D 11/38* (2014.01)
*C09D 11/50* (2014.01)
*C09D 11/52* (2014.01)
*C09D 11/02* (2014.01)
*C09D 11/033* (2014.01)
*C09D 11/037* (2014.01)
*C09D 11/322* (2014.01)
*C09K 11/02* (2006.01)

(52) U.S. Cl.
CPC ............... *B82Y 30/00* (2013.01); *B82Y 40/00* (2013.01); *Y10S 977/774* (2013.01); *Y10S 977/787* (2013.01); *Y10S 977/90* (2013.01); *Y10S 977/95* (2013.01)

step 1, providing quantum dots material and first solvent, and mixing the quantum dots material and the first solvent, together in uniform dispersion to obtain first mixed solution;

↓ step 2, providing second solvent, which is mutually dissolvable with the first solvent, and adding the second solvent in the first mixed solution in uniform mixture to obtain a second mixed solution, of which a viscosity is 1-10cps;

↓ step 3, providing third solvent, which is mutually dissolvable with the first solvent and the second solvent, and adding the third solvent in the second mixed solution in uniform mixture to obtain the quantum dots printing ink, of which a viscosity is 1-10cps, and a surface tension is 30-40dyne/cm.

MANUFACTURE METHOD OF QUANTUM DOTS PRINTING INK AND QUANTUM DOTS PRINTING INK MANUFACTURED WITH THE MANUFACTURE METHOD

FIELD OF THE INVENTION

The present invention relates to a display technology field, and more particularly to a manufacture method of quantum dots printing ink and quantum dots printing ink manufactured with the manufacture method.

BACKGROUND OF THE INVENTION

The semiconductor nanocrystals (NCs) are the semiconductor nanocrystals of 1-100 nm. Because the dimension of the semiconductor nanocrystals is smaller than the bulk exciton Bohr radius of other materials, and shows the strong quantum confinement effect to develop the quasi continuous energy band into the disjunct level structure similar as the molecules', and appears the new material property, which is called the quantum dots (QDs).

Due to the external energy excitation (such as photoluminescence, electroluminescence and cathodoluminescence), the electron jumps from the ground state to the excited state, and the electron and hole in the excited state may form the exciton; the electron and hole has the recombination occurs, and ultimately has the relaxation to the ground state; the excess energy is released through the recombination and the relaxation, and the radiative recombination may occurs to emit photons.

The Quantum Dots Light Emitting Diodes (QD-LEDs) possesses important value of business applications and is drawing the strong interest in research of the people in the latest decade. As a matter of fact, the QD-LEDs has many advantages than the Organic Light Emitting Diodes (OLEDs): (1) the line width of the quantum dots luminescence is 20-30 nm, and relative to the luminescence of organic light emitting >50 nm, the FWHM (full width at half maximum) is narrower, which acts the key function of realizing the color purity of the image; (2) the inorganic material has better thermal stability than the organic material, and as the element is in condition of high brightness or high current density, the Joule heat is the main reason of the element degradation, and with the excellent thermal stability, the inorganic material based element shows longer usage life time; (3) because the life times of the organic materials of red, green, blue, three primary colors are different, the color of the OLED display will change with times but once one material is employed to compose the quantum dots of various sizes, and due to the quantum confinement effect, the luminescence of the three primary colors can be achieved, and the one material can appear the similar degradation life time; (4) the QD-LEDs can realize the infrared emission but the luminous wavelength of the organic material is generally smaller than 1 micrometer; (5) there is no spin statistical constraint for the quantum dots, and the external quantum efficiency (EQE) may reach up to 100%, and the EQE of the QD-LED can be represented $\eta_{Ext}=\eta_r*\eta_{INT}*\eta*\eta_{OUT}$, wherein $\eta_r$ is the probability that the electron and hole in the excited state form the exciton, and $\eta_{INT}$ is the internal quantum efficiency, i.e. the luminescence quantum yield (PLQY), and $\eta$ is the probability of the radiative transition, and $\eta_{OUT}$ is the external coupling efficiency. The restriction of the organic fluorescent dyes $\eta_r$ is 25%, wherein the formation ratio of the single state and the triple state is 1:3, and only the recombination of the single state exciton can result in luminescence. However, due to the spin-orbit coupling, the $\eta_r$ of the organic phosphorescent material is larger than 25%. Significantly, the organic phosphorescent material leads to the degradation of the matrix material, and $\eta_{OUT}$ of the planar light emitting device is about 20%, and the external coupling efficiency can be raised with micro cavity structure. For the QD-LEDs, $\eta_{INT}$ can reach up to 100%, and as energy levels of the electron and hole are proper, $\eta_r$ also can reach up to 100%.

The ink-jet printing is a kind of printing technology of no contact, no pressure, no printing plate. It has the common feature of the digital printing and can realize the printings of kinds of inks. The basic principle is the picture and text information stored in the computer is inputted to the flat printer. Then, with the special device under control of the computer, the nozzle jets ink drops to the surface of the object for printing. After the ink drops spread and is dried, the thin film is formed in the desired position.

Because the ink jet printing technology possesses advantages of high material usage ratio, no need for the mask and suitability of large size panel production, the quantum dots material can be formulated to be ink, and the ink jet printing technology can be employed to manufacture the thin film elements. For making the ink suitable for the ink jet printing technology, the viscosity and the surface tension of the ink is adjusted. The common practice is to add the surfactant. However, after the ink is dried, and once the surfactant is residual in the thin film, the bad influence will exist to the performance of the thin film. The surfactant is equivalent to the impurity in the thin film, which will have influence to the conductivity and light emitting performance of the thin film.

SUMMARY OF THE INVENTION

An objective of the present invention is to provide a manufacture method of quantum dots printing ink. With mixture of kinds of solvents, the quantum dots printing ink of which the performance indicators, such as the viscosity, the surface tension, the dry condition are suitable for jet ink printing can be formulated to avoid adding the surfactant in the ink. The influence to the conductivity and light emitting performance of the thin film can be prevented with that the thin film, which is obtained by jet ink printing the ink, does not include the surfactant.

Another objective of the present invention is to provide quantum dots printing ink, which does not includes surfactant and possesses better conductivity and light emitting performance with that the thin film, which is obtained by jet ink printing the ink, does not include the surfactant.

For realizing the aforesaid objectives, the present invention provides a manufacture method of quantum dots printing ink, comprising steps of:

step 1, providing quantum dots material and first solvent, and mixing the quantum dots material and the first solvent, together in uniform dispersion to obtain first mixed solution;

step 2, providing second solvent, which is mutually dissolvable with the first solvent, and adding the second solvent in the first mixed solution according to a volume ratio that the first solvent and the second solvent is 1:2-2:1 in uniform mixture to obtain a second mixed solution, of which a viscosity is 1-10 cps;

step 3, providing third solvent, which is mutually dissolvable with the first solvent and the second solvent, and adding the third solvent in the second mixed solution according to a volume ratio that a sum of the first solvent and the second solvent, and the third solvent is 1:2-2:1 in uniform mixture to obtain the quantum dots printing ink, of which a viscosity is 1-10 cps, and a surface tension is 30-40 dyne/cm.

The manufacture method further comprises step 4 of: providing fourth solvent, which is mutually dissolvable with the first solvent, the second solvent and the third solvent, and adding the fourth solvent in the quantum dots printing ink according to a volume ratio that the fourth solvent and a sum of the first solvent, the second solvent and the third solvent is smaller than 1/9 in uniform mixture, so as to adjust a room temperature vapor pressure of the quantum dots printing ink under 100 mmHg as maintaining the viscosity of the quantum dots printing ink to be 1-10 cps, and the surface tension to be 30-40 dyne/cm.

Both the viscosities of the first solvent and the second solvent cannot be less than 1 cps, and cannot be larger than 10 cps.

The first solvent is monoethylene glycol; the second solvent is 1-butanol; the third solvent is pyrrolidinone; the fourth solvent is propylene glycol propyl ether.

In the quantum dots printing ink, a mass percentage of the quantum dots material is 0.1 wt %-10 wt %.

The present invention further provides quantum dots printing ink, comprising quantum dots material and first solvent, second solvent and third solvent, which are dissolvable with one another, and a volume ratio of the first solvent and the second solvent is 1:2-2:1, and a volume ratio that a sum of the first solvent and the second solvent, and the third solvent is 1:2-2:1, and a viscosity of the quantum dots printing ink is 1-10 cps, and a surface tension is 30-40 dyne/cm.

The quantum dots printing ink further comprises fourth solvent, which is mutually dissolvable with the first solvent, the second solvent and the third solvent, and a volume ratio that the fourth solvent and a sum of the first solvent, the second solvent and the third solvent is smaller than 1/9 to make a room temperature vapor pressure of the quantum dots printing ink under 100 mmHg.

Both the viscosities of the first solvent and the second solvent cannot be less than 1 cps, and cannot be larger than 10 cps.

The first solvent is monoethylene glycol; the second solvent is 1-butanol; the third solvent is pyrrolidinone; the fourth solvent is propylene glycol propyl ether.

A mass percentage of the quantum dots material is 0.1 wt %-10 wt %.

The present invention further provides quantum dots printing ink, comprising quantum dots material and first solvent, second solvent and third solvent, which are dissolvable with one another, and a volume ratio of the first solvent and the second solvent is 1:2-2:1, and a volume ratio that a sum of the first solvent and the second solvent, and the third solvent is 1:2-2:1, and a viscosity of the quantum dots printing ink is 1-10 cps, and a surface tension is 30-40 dyne/cm;

wherein both the viscosities of the first solvent and the second solvent cannot be less than 1 cps, and cannot be larger than 10 cps;

wherein a mass percentage of the quantum dots material is 0.1 wt %-10 wt %.

The benefits of the present invention are: the present invention provides a manufacture method of quantum dots printing ink. By mixing the first solvent and the second solvent, the viscosity of the quantum dots printing ink is adjusted to be in a predetermined range. Then, by mixing the third solvent with the first solvent and the second solvent, the surface tension of the quantum dots printing ink is adjusted to be in a predetermined range while maintaining the viscosity of the quantum dots printing ink to be in the predetermined range. Furthermore, by adding the fourth solvent in the quantum dots printing ink, the vapor pressure thereof is adjusted to be in a reasonable range. With mixture of kinds of solvents, the quantum dots printing ink of which the performance indicators, such as the viscosity, the surface tension, the dry condition are suitable for jet ink printing can be formulated to avoid adding the surfactant in the ink. The influence to the conductivity and light emitting performance of the thin film can be prevented with that the thin film, which is obtained by jet ink printing the quantum dots printing ink, does not include the surfactant. The present invention provides quantum dots printing ink, including kinds of solvents, and is the quantum dots printing ink of which the performance indicators, such as the viscosity, the surface tension, the dry condition are suitable for jet ink printing. The quantum dots printing ink does not includes surfactant and possesses better conductivity and light emitting performance with that the thin film, which is obtained by jet ink printing the ink, does not include the surfactant.

BRIEF DESCRIPTION OF THE DRAWINGS

In order to better understand the characteristics and technical aspect of the invention, please refer to the following detailed description of the present invention is concerned with the diagrams, however, provide reference to the accompanying drawings and description only and is not intended to be limiting of the invention.

In drawings,

FIG. 1 is a flowchart of a manufacture method of quantum dots printing ink according to the present invention.

DETAILED DESCRIPTION OF PREFERRED EMBODIMENTS

For better explaining the technical solution and the effect of the present invention, the present invention will be further described in detail with the specific embodiments.

Please refer to FIG. 1. The present invention provides a manufacture method of quantum dots printing ink, comprising steps of:

step 1, providing quantum dots material and first solvent, and mixing the quantum dots material and the first solvent, together in uniform dispersion to obtain first mixed solution.

Specifically, the quantum dots material can be nanocrystals of II-VI elements, III-V elements, IV elements, or other compounds.

Furthermore, the quantum dots material can be hole injecting layer (HIL) material, hole transporting layer (HTL) material, emission layer (EML) material or electron transporting layer (ETL) material.

Specifically, in the step 1, the quantum dots material is uniformly dispersed in the first solvent by stirring with ultrasonic wave oscillation to obtain first mixed solution.

step 2, providing second solvent, which is mutually dissolvable with the first solvent, and adding the second solvent in the first mixed solution according to a volume ratio that the first solvent and the second solvent is 1:2-2:1 in uniform mixture to obtain a second mixed solution, of which a viscosity is 1-10 cps.

Specifically, both the viscosities of the first solvent and the second solvent cannot be less than 1 cps, and cannot be larger than 10 cps. The viscosity of the second mixed solution is adjusted to be 1-10 cps by adjusting the volume ratio of the first solvent and the second solvent.

Preferably, the volume ratio of the first solvent and the second solvent is 2:1, 1:1 or 1:2.

Specifically, in the step 2, the second solvent is uniformly mixed with the first mixed solution by stirring to obtain the second mixed solution.

step 3, providing third solvent, which is mutually dissolvable with the first solvent and the second solvent, and adding the third solvent in the second mixed solution according to a volume ratio that a sum of the first solvent and the second solvent, and the third solvent is 1:2-2:1 in uniform mixture to obtain the quantum dots printing ink, of which a viscosity is 1-10 cps, and a surface tension is 30-40 dyne/cm.

Preferably, the volume ratio that a sum of the first solvent and the second solvent, and the third solvent is 2:1, 1:1 or 1:2.

By adjusting the volume ratio of the third solvent and a mixture of the first solvent and the second solvent, the surface tension of the quantum dots printing ink is adjusted to be 30-40 dyne/cm as maintaining the viscosity of the quantum dots printing ink to be 1-10 cps.

Specifically, in the step 3, the third solvent is uniformly mixed with the second mixed solution by stirring to obtain the quantum dots printing ink.

Preferably, the manufacture method of quantum dots printing ink according to the present invention further comprises step 4: providing fourth solvent, which is mutually dissolvable with the first solvent, the second solvent and the third solvent, and adding the fourth solvent in the quantum dots printing ink according to a volume ratio that the fourth solvent and a sum of the first solvent, the second solvent and the third solvent is smaller than 1/9 in uniform mixture, and adjusting a room temperature vapor pressure of the quantum dots printing ink under 100 mmHg as maintaining the viscosity of the quantum dots printing ink to be 1-10 cps, and the surface tension to be 30-40 dyne/cm. It can prevent the evaporation of the quantum dots printing ink is too fast in the jet ink printing process, and the ink drop can gather to form a film, and ultimately a thin film of uniform thickness is formed.

Specifically, the fourth solvent can be propylene glycol propyl ether.

Specifically, in the step 4, the fourth solvent and the quantum dots printing ink are uniformly mixed by stirring.

Specifically, in the manufactured quantum dots printing ink of the present invention, a mass percentage of the quantum dots material is 0.1 wt %-10 wt %.

Preferably, the first solvent is monoethylene glycol; the second solvent is 1-butanol; the third solvent is pyrrolidinone.

In the aforesaid manufacture method of quantum dots printing ink, by mixing the first solvent and the second solvent, the viscosity of the quantum dots printing ink is adjusted to be in a predetermined range. Then, by mixing the third solvent with the first solvent and the second solvent, the surface tension of the quantum dots printing ink is adjusted to be in a predetermined range while maintaining the viscosity of the quantum dots printing ink to be in the predetermined range. Furthermore, by adding the fourth solvent in the quantum dots printing ink, the vapor pressure thereof is adjusted to be in a reasonable range. With mixture of kinds of solvents, the quantum dots printing ink of which the performance indicators, such as the viscosity, the surface tension, the dry condition are suitable for jet ink printing can be formulated to avoid adding the surfactant in the ink. The influence to the conductivity and light emitting performance of the thin film can be prevented with that the thin film, which is obtained by jet ink printing the ink, does not include the surfactant.

On the basis of the aforesaid manufacture method, the present invention further provides quantum dots printing ink, comprising quantum dots material and first solvent, second solvent and third solvent, which are dissolvable with one another, and a volume ratio of the first solvent and the second solvent is 1:2-2:1, and a volume ratio that a sum of the first solvent and the second solvent, and the third solvent is 1:2-2:1, and a viscosity of the quantum dots printing ink is 1-10 cps, and a surface tension is 30-40 dyne/cm.

Furthermore, the quantum dots printing ink further comprises fourth solvent, which is mutually dissolvable with the first solvent, the second solvent and the third solvent, and a volume ratio that the fourth solvent and a sum of the first solvent, the second solvent and the third solvent is smaller than 1/9 to make a room temperature vapor pressure of the quantum dots printing ink under 100 mmHg. It can prevent the evaporation of the quantum dots printing ink is too fast in the jet ink printing process, and the ink drop can gather to form a film, and ultimately a thin film of uniform thickness is formed.

Specifically, the fourth solvent can be propylene glycol propyl ether.

Specifically, both the viscosities of the first solvent and the second solvent cannot be less than 1 cps, and cannot be larger than 10 cps. Preferably, the first solvent is monoethylene glycol; the second solvent is 1-butanol; the third solvent is pyrrolidinone.

Specifically, in the quantum dots printing ink, a mass percentage of the quantum dots material is 0.1 wt %-10 wt %.

Specifically, the quantum dots material can be nanocrystals of II-VI elements, III-V elements, IV elements, or other compounds.

Furthermore, the quantum dots material can be hole injecting layer (HIL) material, hole transporting layer (HTL) material, emission layer (EML) material or electron transporting layer (ETL) material.

The aforesaid quantum dots printing ink, in which the solvent is a mixed solvent including kinds of solvents, is the quantum dots printing ink of which the performance indicators, such as the viscosity, the surface tension, the dry condition are suitable for jet ink printing. The quantum dots printing ink does not includes surfactant and possesses better conductivity and light emitting performance with that the thin film, which is obtained by jet ink printing the ink, does not include the surfactant.

In conclusion, the present invention provides a manufacture method of quantum dots printing ink. By mixing the first solvent and the second solvent, the viscosity of the quantum dots printing ink is adjusted to be in a predetermined range. Then, by mixing the third solvent with the first solvent and the second solvent, the surface tension of the quantum dots printing ink is adjusted to be in a predetermined range while maintaining the viscosity of the quantum dots printing ink to be in the predetermined range. Furthermore, by adding the fourth solvent in the quantum dots printing ink, the vapor pressure thereof is adjusted to be in a reasonable range. With mixture of kinds of solvents, the quantum dots printing ink of which the performance indicators, such as the viscosity, the surface tension, the dry condition are suitable for jet ink printing can be formulated to avoid adding the surfactant in the ink. The influence to the conductivity and light emitting performance of the thin film can be prevented with that the thin film, which is obtained by jet ink printing the quantum dots printing ink, does not include the surfactant. The present invention provides quantum dots printing ink, including kinds of solvents, and is the quantum dots printing ink of which the performance indicators, such as the viscosity, the surface tension, the dry condition are suitable for jet ink printing. The quantum dots printing ink does not includes surfactant and possesses better conductivity and light emitting performance with that the thin film, which is obtained by jet ink printing the ink, does not include the surfactant.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A manufacture method of quantum dots printing ink, comprising steps of:
    step 1, providing quantum dots material and first solvent, and mixing the quantum dots material and the first solvent, together in uniform dispersion to obtain first mixed solution;
    step 2, providing second solvent, which is mutually dissolvable with the first solvent, and adding the second solvent in the first mixed solution according to a volume ratio that the first solvent and the second solvent is 1:2-2:1 in uniform mixture to obtain a second mixed solution, of which a viscosity is 1-10 cps;
    step 3, providing third solvent, which is mutually dissolvable with the first solvent and the second solvent, and adding the third solvent in the second mixed solution according to a volume ratio that a sum of the first solvent and the second solvent, and the third solvent is 1:2-2:1 in uniform mixture to obtain the quantum dots printing ink, of which a viscosity is 1-10 cps, and a surface tension is 30-40 dyne/cm; and
    step 4, providing fourth solvent, which is mutually dissolvable with the first solvent, the second solvent and the third solvent, and adding the fourth solvent in the quantum dots printing ink according to a volume ratio that the fourth solvent and a sum of the first solvent, the second solvent and the third solvent is smaller than 1/9 in uniform mixture, so as to adjust a room temperature vapor pressure of the quantum dots printing ink under 100 mmHg as maintaining the viscosity of the quantum dots printing ink to be 1 -10 cps, and the surface tension to be 30-40 dyne/cm;
    wherein the first solvent is monoethylene glycol; the second solvent is 1-butanol; the third solvent is pyrrolidinone; the fourth solvent is propylene glycol propyl ether.

2. The manufacture method of the quantum dots printing ink according to claim 1, wherein both the viscosities of the first solvent and the second solvent cannot be less than 1 cps, and cannot be larger than 10 cps.

3. The manufacture method of the quantum dots printing ink according to claim 1, wherein in the quantum dots printing ink, a mass percentage of the quantum dots material is 0.1 wt %-10 wt %.

4. Quantum dots printing ink, comprising quantum dots material and first solvent, second solvent and third solvent, which are dissolvable with one another, and a volume ratio of the first solvent and the second solvent is 1:2-2:1, and a volume ratio that a sum of the first solvent and the second solvent, and the third solvent is 1:2-2:1, and a viscosity of the quantum dots printing ink is 1-10 cps, and a surface tension is 30-40 dyne/cm; and
    further comprising fourth solvent, which is mutually dissolvable with the first solvent, the second solvent and the third solvent, and a volume ratio that the fourth solvent and a sum of the first solvent, the second solvent and the third solvent is smaller than 1/9 to make a room temperature vapor pressure of the quantum dots printing ink under 100 mmHg;
    wherein the first solvent is monoethylene glycol; the second solvent is 1-butanol; the third solvent is pyrrolidinone; the fourth solvent is propylene glycol propyl ether.

5. The quantum dots printing ink according to claim 4, wherein both the viscosities of the first solvent and the second solvent cannot be less than 1 cps, and cannot be larger than 10 cps.

6. The quantum dots printing ink according to claim 4, wherein a mass percentage of the quantum dots material is 0.1 wt %-10 wt %.

7. Quantum dots printing ink, comprising quantum dots material and first solvent, second solvent and third solvent, which are dissolvable with one another, and a volume ratio of the first solvent and the second solvent is 1:2-2:1, and a volume ratio that a sum of the first solvent and the second solvent, and the third solvent is 1:2-2:1, and a viscosity of the quantum dots printing ink is 1-10 cps, and a surface tension is 30-40 dyne/cm;
    wherein both the viscosities of the first solvent and the second solvent cannot be less than 1 cps, and cannot be larger than 10 cps;
    wherein a mass percentage of the quantum dots material is 0.1 wt %-10 wt %;
    wherein the quantum dots printing ink further comprises fourth solvent, which is mutually dissolvable with the first solvent, the second solvent and the third solvent, and a volume ratio that the fourth solvent and a sum of the first solvent, the second solvent and the third solvent is smaller than 1/9 to make a room temperature vapor pressure of the quantum dots printing ink under 100 mmHg; and
    wherein the first solvent is monoethylene glycol; the second solvent is 1-butanol; the third solvent is pyrrolidinone; the fourth solvent is propylene glycol propyl ether.

* * * * *